(12) United States Patent
Behling et al.

(10) Patent No.: US 10,879,779 B2
(45) Date of Patent: Dec. 29, 2020

(54) ELECTRICAL MACHINE DISCONNECTION SYSTEMS

(71) Applicant: Hamilton Sundstrand Corporation, Charlotte, NC (US)

(72) Inventors: David S. Behling, Belvidere, IL (US); Todd A. Spierling, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 92 days.

(21) Appl. No.: 16/242,729

(22) Filed: Jan. 8, 2019

(65) Prior Publication Data
US 2020/0220442 A1   Jul. 9, 2020

(51) Int. Cl.
*H02K 21/02* (2006.01)
*H02K 21/14* (2006.01)

(52) U.S. Cl.
CPC .......... *H02K 21/028* (2013.01); *H02K 21/14* (2013.01); *H02K 2213/09* (2013.01)

(58) Field of Classification Search
CPC .. H02K 21/028; H02K 21/14; H02K 2213/09; H02K 1/22; H02K 1/2753; H02K 5/1732; H02K 21/22; H02K 21/23; H02K 2201/18
USPC ........ 310/190, 191, 112, 114, 113, 266, 209, 310/12.14, 12.15, 12.17, 12.09
See application file for complete search history.

(56) References Cited

U.S. PATENT DOCUMENTS

| | | | | |
|---|---|---|---|---|
| 4,578,609 A | * | 3/1986 | McCarty | H02K 21/028 310/156.24 |
| 4,642,683 A | * | 2/1987 | Alkofer | H04N 1/6027 355/38 |
| 5,821,710 A | * | 10/1998 | Masuzawa | H02K 16/02 318/400.41 |
| 7,804,263 B2 | * | 9/2010 | Himmelmann | H02K 7/12 290/34 |
| 9,193,451 B2 | | 11/2015 | Salyer | |
| 9,493,245 B2 | | 11/2016 | Salyer | |
| 9,567,922 B2 | | 2/2017 | Lofgren | |
| 9,920,689 B2 | | 3/2018 | Nalim | |
| 2003/0057793 A1 | * | 3/2003 | Yang | H02K 7/06 310/191 |
| 2003/0164654 A1 | * | 9/2003 | Thaxton | F16C 32/0459 310/90.5 |

(Continued)

FOREIGN PATENT DOCUMENTS

| | | |
|---|---|---|
| JP | 2007267453 A | 10/2007 |
| JP | 2010213488 A | 9/2010 |

OTHER PUBLICATIONS

Extended European search report issued in corresponding EP application No. 19209259.1, dated May 18, 2020.

*Primary Examiner* — Tulsidas C Patel
*Assistant Examiner* — Ahmed Elnakib
(74) *Attorney, Agent, or Firm* — Locke Lord LLP; Daniel J. Fiorello; Scott D. Wofsy

(57) ABSTRACT

A hybrid drive system can include a shaft, an electrical machine comprising a rotor and a stator, and a mechanical disconnect system connecting the rotor to the shaft. The mechanical disconnect system is configured to mechanically connect the rotor to the shaft in a first state and to mechanically disconnect the rotor from the shaft in a second state such that rotor does not drive the shaft or such that the rotor is not driven by the shaft. The rotor can be a permanent magnet rotor, for example.

9 Claims, 8 Drawing Sheets

(56) References Cited

U.S. PATENT DOCUMENTS

| | | | |
|---|---|---|---|
| 2007/0241628 A1* | 10/2007 | Himmelmann | H02K 21/027 310/190 |
| 2009/0192013 A1* | 7/2009 | Kim | B60W 10/06 477/3 |
| 2015/0326101 A1* | 11/2015 | Ishibashi | H02K 21/16 310/191 |
| 2018/0015817 A1 | 1/2018 | Samie et al. | |

* cited by examiner

ELECTRICAL MACHINE DISCONNECTION SYSTEMS

BACKGROUND

1. Field

This disclosure relates to electrical machine systems, e.g., systems for selectively disconnecting an electrical machine from a shaft.

2. Description of Related Art

Hybrid propulsion concepts combine a fossil fuel driven motor with an electrically driven motor to drive a propeller or fan. Potential system failure modes precipitate the need to be able to disconnect the electrically driven motor from the shaft, e.g., when driven by a fuel powered engine.

Such conventional methods and systems have generally been considered satisfactory for their intended purpose. However, there is still a need in the art for electrical machine disconnection systems. The present disclosure provides a solution for this need.

SUMMARY

In accordance with at least one aspect of this disclosure, a hybrid drive system can include a shaft, an electrical machine comprising a rotor and a stator, and a mechanical disconnect system connecting the rotor to the shaft. The mechanical disconnect system is configured to mechanically connect the rotor to the shaft in a first state and to mechanically disconnect the rotor from the shaft in a second state such that rotor does not drive the shaft or such that the rotor is not driven by the shaft.

The rotor can be a permanent magnet rotor, for example. The mechanical disconnect system can include a clutch mechanism configured to mechanically connect and disconnect the rotor from the shaft.

In certain embodiments, the mechanical disconnect system can include a gearing assembly configured to be engaged by the clutch mechanism in the first state and disengaged by the clutch mechanism in the second state to provide a geared connection between the rotor and the shaft in the first state. The gearing assembly can be configured to provide a freewheeling connection between the rotor and the shaft in the second state to mechanically disconnect the rotor from the shaft.

The gearing assembly can include a carrier shaft configured to be engaged by the clutch mechanism to stop motion of the carrier shaft in the first state, and to be disengaged by the clutch mechanism to allow freewheeling in the second state. The carrier shaft can include a plurality of planet gears rotatably attached to the carrier shaft. The shaft can include a sun gear disposed thereon meshed with the planet gears. The rotor can include a ring gear disposed thereon meshed with the planet gears.

In certain embodiments, the clutch mechanism can be an over-running clutch connected between the shaft and the rotor. The over-running clutch can be configured to allow torque to be applied in only one direction such that the rotor can drive the shaft, but shaft cannot drive the rotor.

In certain embodiments, the clutch mechanism can be a face clutch mechanism configured to slidably actuate a face clutch member that rotates with the shaft to engage the rotor in the first state and to disengage the rotor in the second state to mechanically disconnect the rotor from the shaft. For example, the rotor can include one or more rotor splines configured to engage with one or more face splines of the face clutch member in the first state. The face clutch member can be splined to the shaft via one or more shaft splines in connection with one or more axial splines of the face clutch member.

The face clutch mechanism can include a biasing member configured to bias the face clutch member toward the first position. The clutch mechanism can include a friction clutch mechanism having an actuator and a friction member. For example, the actuator can connect to the shaft to rotate with the shaft. The friction member can be configured to be pushed by the actuator to contact a rotor face to provide a frictional mechanical connection between the shaft and the rotor in the first state and to not push on the friction member in the second state to mechanically disconnect the shaft and the rotor in the second state.

In certain embodiments, the clutch mechanism can include a hydraulic coupling disposed around a rotor fan and a shaft fan. The hydraulic coupling can be configured to be sealed to the rotor and the shaft to retain a liquid therein when in a flooded state. The rotor fan and the shaft fan can be configured to be fluidly coupled in the flooded state such that the rotor fan drives the shaft fan, and the rotor fan and the shaft fan can be configured to be fluidly decoupled in a drained state (e.g., when sufficient liquid, e.g., all is drained from the coupling, e.g., and the couple is filled with air or vacuum).

Certain embodiments can include one or more bearings disposed between the rotor and the shaft to allow the shaft to rotate relative to the rotor in the second state. Certain embodiments can include a fuel powered engine operatively connected to the shaft to drive the shaft. While certain embodiments of mechanical disconnection systems are disclosed above, any suitable mechanical disconnection system as appreciated by those having ordinary skill in the art in view of this disclosure is contemplated herein.

In accordance with at least one aspect of this disclosure, a method can include mechanically disconnecting a rotor of an electrical machine from a shaft when an engine is driving the shaft. The method can include mechanically disconnecting the rotor of the electrical machine includes releasing a clutch mechanism. Any other suitable methods and/or portion thereof are contemplated herein.

In accordance with at least one aspect of this disclosure, a hybrid drive system can include a shaft, an electrical machine having a stator, and a rotor attached to the shaft to rotate with the shaft relative to the stator, and a rotor electromagnetic property modifying system configured to modify an electromagnetic property of the rotor to cause the rotor and the stator to be at least partially electromagnetically inactivated. For example, the rotor electromagnetic property modifying system can include a pole modification device configured to modify one or more magnetic poles of the rotor to at least partially electromagnetically inactivate the electrical machine.

In certain embodiments, the rotor can be a permanent magnet rotor. The rotor can include a first portion and a second portion rotatable relative to the first portion. The rotor can include plurality of first permanent magnet poles disposed on the first portion and a plurality of second permanent magnet poles disposed on the second portion. For example, a clocking mechanism can be configured to rotate one or both of the first portion and the second portion to change a relative position between the first poles of the first portion and the second poles of the second portion to at least partially electromagnetically inactivate the electrical machine.

The clocking mechanism can be configured to move the plurality of poles from an aligned state to a misaligned state to at least partially electromagnetically inactivate the electrical machine. For example, the first poles and the second poles can include circumferentially alternating north poles and south poles. The aligned state can be defined by each north pole of the first poles aligning with each north pole of the second poles, and each south pole of the first poles aligning with the each south pole of the second poles. The misaligned state can be defined by opposite pole alignment such that north poles of each portion align with south poles of each portion. The aligned state can correspond to an activated state, and the misaligned state can correspond to an inactivated state where rotor rotation does not cause output from the stator and such that input to the stator does not cause rotor rotation.

In accordance with at least one aspect of this disclosure, a rotor, e.g., as described above, for an electrical machine can include a first portion and a second portion configured to connect to a shaft and to rotate relative to each other on the shaft. At least one clocking mechanism, e.g., as described above, can be defined by or connected to the first portion and the second portion and configured to move the first portion and second portion relative to each other to modify an electromagnetic property of the rotor. The rotor can include any other suitable component as disclosed herein. While embodiments are described above, any suitable electromagnetic inactivation (e.g., preventing generation or output of electrical current from the stator due to rotation of the rotor, and/or preventing rotor motion due to input current to the stator) is contemplated herein as appreciated by those having ordinary skill in the art in view of this disclosure.

In accordance with at least one aspect of this disclosure, a method, can include modifying an electromagnetic property of a magnet rotor of an electrical machine to at least partially electromagnetically inactivate an electrical machine having a rotor attached to a rotating shaft and a stator without stopping rotation of the rotor. Modifying the electromagnetic property can include rotating at least a first portion of the rotor relative to a second portion of the rotor. In certain embodiments, modifying the electromagnetic property can include modifying magnetic pole alignment of one or more permanent magnetic poles of the rotor. Any other suitable methods and/or portions thereof are contemplated herein.

In accordance with at least one aspect of this disclosure, a hybrid drive system can include a shaft and an electrical machine having a stator and a rotor attached to the shaft to rotate with the shaft relative to the stator. The system can include an electromagnetic disconnect system configured to modify a position of the rotor to cause the rotor and the stator to be at least partially electromagnetically decoupled. The rotor can include a permanent magnet, for example.

The electromagnetic disconnect system can be configured to move the rotor relative to the stator to at least partially electromagnetically decouple the rotor and the stator. The electromagnetic disconnect system can be configured to move at least a portion of the rotor axially along the shaft.

The electromagnetic disconnect system can include at least one hydraulic actuator assembly configured to selectively move at least a portion of the rotor axially along the shaft to at least partially electromagnetically decouple the rotor and the stator. For example, the rotor can include a first portion and a second portion configured to move relative to each other between an electromagnetically coupled position and an at least partially electromagnetically decoupled position.

In certain embodiments, the first portion and the second portion can define at least one hydraulic cavity of the at least one hydraulic actuator assembly. In certain embodiments, the at least one hydraulic cavity is a single annular cavity.

The first portion and the second portion can be slidably splined to the shaft via one or more mating splines on the shaft. The first portion and the second portion can be sealed to each other and to the shaft with one or more seals. In certain embodiments, the at least one cavity can be in fluid communication with a shaft cavity through a shaft hole to provide hydraulic pressure to the at least one cavity through the shaft. The system can include one or more backstops configured to limit motion and prevent separation of the first portion and the second portion in the at least partially electromagnetically decoupled position.

In certain embodiments, the at least one hydraulic actuator assembly can include at least one nested piston assembly comprising a cylinder and a piston in a sealed sliding connection within the cylinder. The piston and the cylinder can be configured to move relative to each other to move the first portion and the second portion. The at least one hydraulic actuator assembly can include a plurality of hydraulic actuator assemblies disposed circumferentially around at least one of the first portion or the second portion of the rotor to provide multiple actuation points.

In accordance with at least one aspect of this disclosure, a rotor for an electrical machine can include a first portion and a second portion configured to slidably connect to a shaft and to move relative to each other on the shaft. The rotor can include at least one hydraulic actuator assembly at least partially defined by or connected to the first portion and the second portion and configured to move the first portion and second portion between an electromagnetically coupled position and an at least partially electromagnetically decoupled position on the shaft. In certain embodiments, the first portion and the second portion can define at least one hydraulic cavity of the at least one hydraulic actuator assembly.

In accordance with at least one aspect of this disclosure, a method can include at least partially electromagnetically decoupling a rotor attached to a rotating shaft from a stator of an electrical machine without stopping rotation of the rotor. At least partially electromagnetically decoupling can include axially moving at least a portion of the rotor relative to the stator.

In certain embodiments, axially moving at least a portion of the rotor relative to the stator can include actuating a hydraulic actuator to move at least a portion of the rotor relative to the stator. Axially moving at least a portion of the rotor relative to the stator can include moving a first portion of the rotor and a second portion of the rotor apart from each other to at least partially electromagnetically decouple the first portion and the second portion from the stator.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
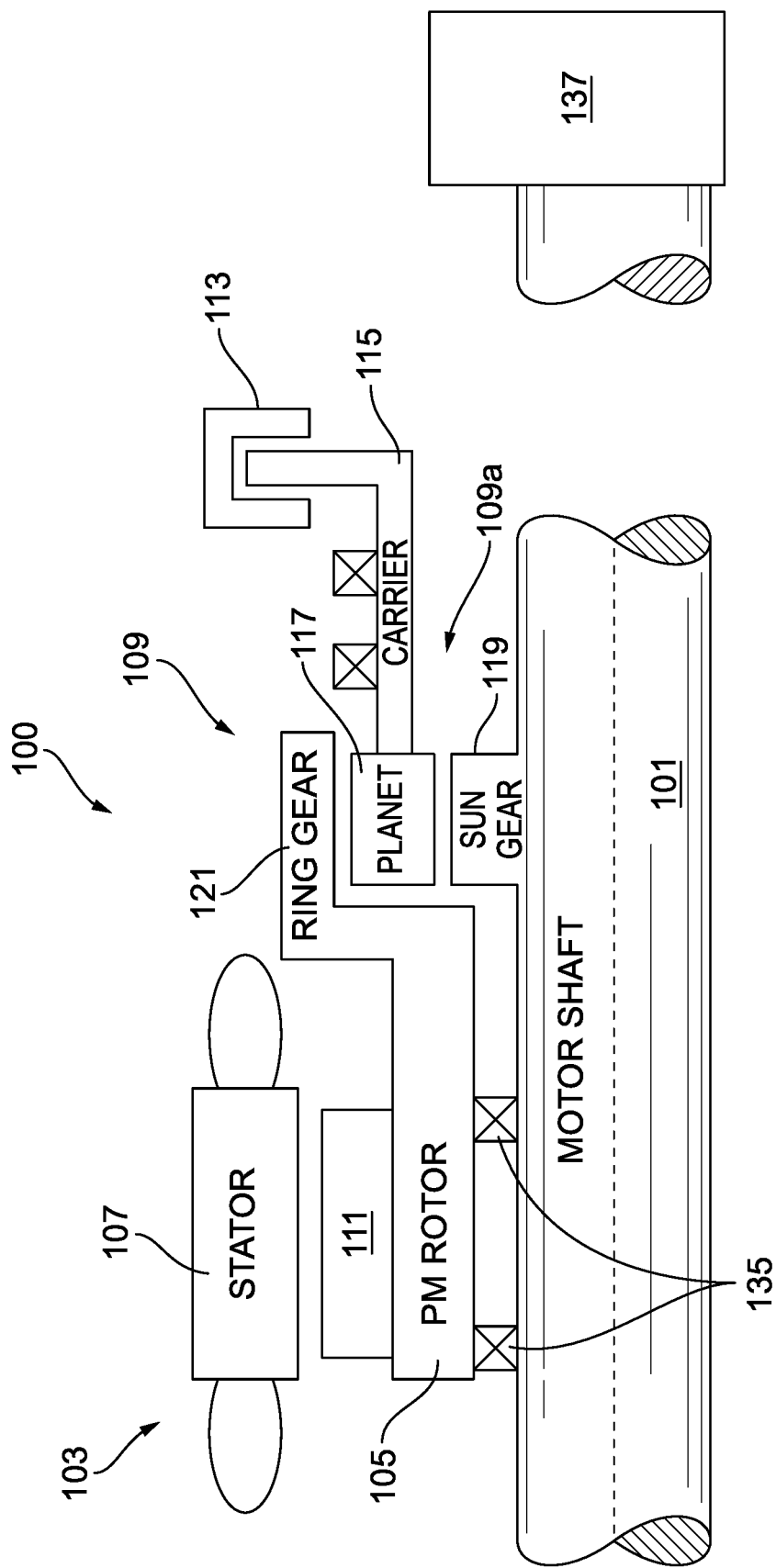
FIG. 1 is a cross-sectional schematic view of an embodiment of a system in accordance with this disclosure, showing an embodiment of a mechanical disconnect system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-8. Certain embodiments described herein can be used cause an electrical machine to not produce electricity due to rotation of a rotor or to prevent force transfer to the rotor when current is applied to the stator.

In accordance with at least one aspect of this disclosure, referring to FIGS. 1-5, a hybrid drive system 100, 200, 300, 400, 500 can include a shaft 101, 201, 301, 401, 501, an electrical machine 103, 203, 303, 403, 503 comprising a rotor 105, 205, 305, 405, 505 and a stator 107. The system 100, 200, 300, 400, 500 can include a mechanical disconnect system 109, 209, 309, 409, 509 connecting the rotor 105, 205, 305, 405, 505 to the shaft. The mechanical disconnect system 109, 209, 309, 409, 509 can be configured to mechanically connect the rotor 105, 205, 305, 405, 505 to the shaft 101, 201, 301, 401, 501 in a first state and to mechanically disconnect the rotor 105, 205, 305, 405, 505 from the shaft 101, 201, 301, 401, 501 in a second state such that rotor 105, 205, 305, 405, 505 does not drive the shaft 101, 201, 301, 401, 501 or such that the rotor 105, 205, 305, 405, 505 is not driven by the shaft 101, 201, 301, 401, 501.

As shown the rotor 105, 205, 305, 405, 505 can be a permanent magnet rotor (e.g., including one or more permanent magnets 111), for example. However, any suitable type of rotor (e.g., an electromagnet rotor) for any suitable type of electrical machine is contemplated herein (e.g., synchronous, induction, etc.). The mechanical disconnect system 109, 209, 309, 409, 509 can include a clutch mechanism 113, 213, 313, 413, 513 configured to mechanically connect and disconnect the rotor 105, 205, 305, 405, 505 from the shaft 101, 201, 301, 401, 501.

As shown in FIG. 1, in certain embodiments, the mechanical disconnect system 109 can include a gearing assembly 109a configured to be engaged by the clutch mechanism 113 in the first state and disengaged by the clutch mechanism 113 in the second state to provide a geared connection between the rotor 105 and the shaft 105 in the first state. The gearing assembly 109a can be configured to provide a freewheeling connection between the rotor 105 and the shaft 101 in the second state to mechanically disconnect the rotor 105 from the shaft 101.

The gearing assembly can include a carrier shaft 115 configured to be engaged by the clutch mechanism 113 to stop motion of the carrier shaft 115 in the first state, and to be disengaged by the clutch mechanism 113 to allow freewheeling in the second state. The carrier shaft 115 can include a plurality of planet gears 117 rotatably attached (e.g., pinned to rotate on) to the carrier shaft 115. The shaft 101 can include a sun gear 119 disposed thereon (e.g., integrally formed therewith) and meshed with the planet gears 117. The rotor 105 can include a ring gear 121 disposed thereon (e.g., integrally formed therewith) and meshed with the planet gears 117. In the first state (e.g., where the electrical machine 103 is driving the shaft 101), the clutch mechanism 113 can grip a portion of the carrier shaft 115 to stop the carrier shaft 115 relative to the shaft 101, which causes the planet gears 117 to be in a fixed position circumferentially relative to the rotating shaft 101, which causes planet gears 117 to rotate about their own axis and to transfer torque from the ring gear 121 to the shaft 101. In the second state (e.g., where the fuel powered engine drives shaft 101 without the electrical machine 103), the clutch mechanism 113 can be released which causes the carrier shaft 115 to freewheel such that planet gears 117 can rotate circumferentially around the shaft 101 and about their own axis which prevents transfer of torque from the shaft 101 to the ring gear 121 and, thus, the rotor 105.

Any suitable rotor to shaft gear ratio (e.g., 1:1, 1:1.5) is contemplated herein. Any other suitable gearing architecture and/or components to selectively prevent power transfer between the rotor 105 and the shaft 101 are contemplated herein.

Figure 2:
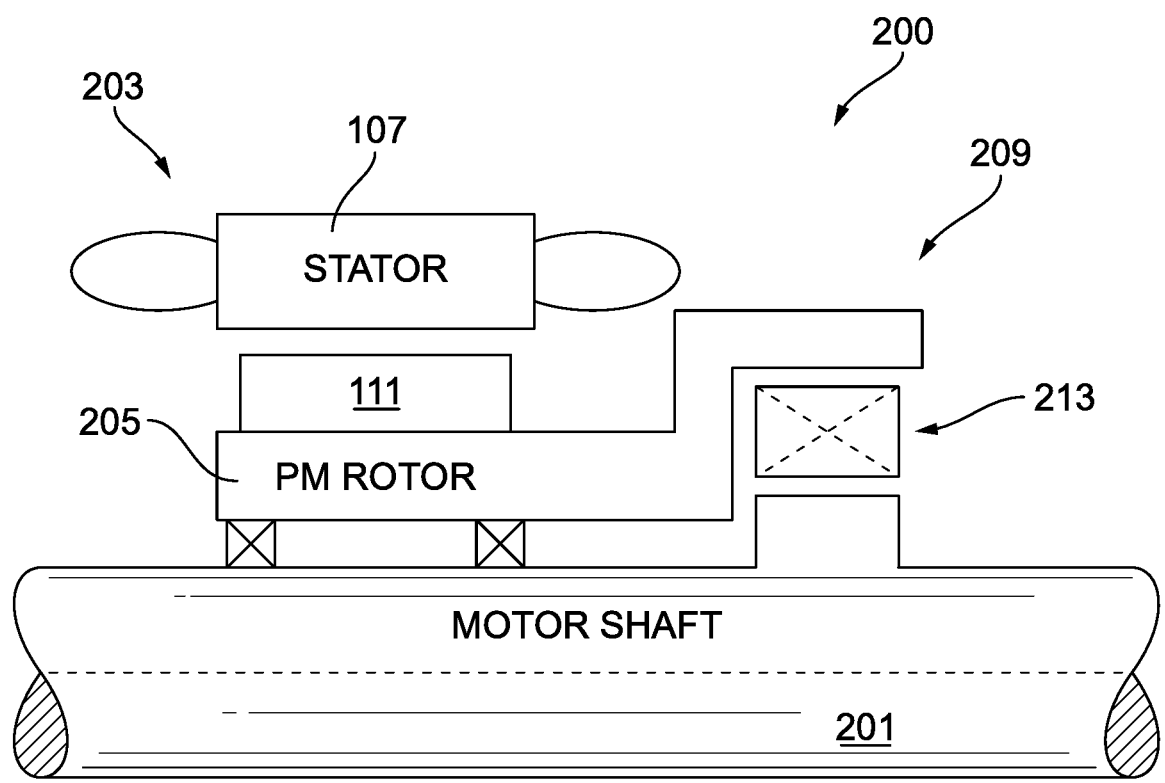
FIG. 2 is a cross-sectional schematic view of an embodiment of a system in accordance with this disclosure, showing an embodiment of a mechanical disconnect system in accordance with this disclosure.

Referring to FIG. 2, in certain embodiments, the clutch mechanism 213 can be an over-running clutch 213 connected between the shaft 201 and the rotor 205. The over-running clutch can be configured to allow torque to be applied in only one direction such that the rotor 205 can drive the shaft 201, but shaft 201 cannot drive the rotor 205 (e.g., so that when the electrical machine 203 is not in use, the fuel powered engine cannot drive the electrical machine 203 to act as a generator). Any suitable over running clutch as appreciated by those having ordinary skill in the art, in view of this disclosure, is contemplate herein. For example, the over running clutch 213 can directly connect between the shaft 201 and the rotor 205, e.g., as shown.

Figure 3:
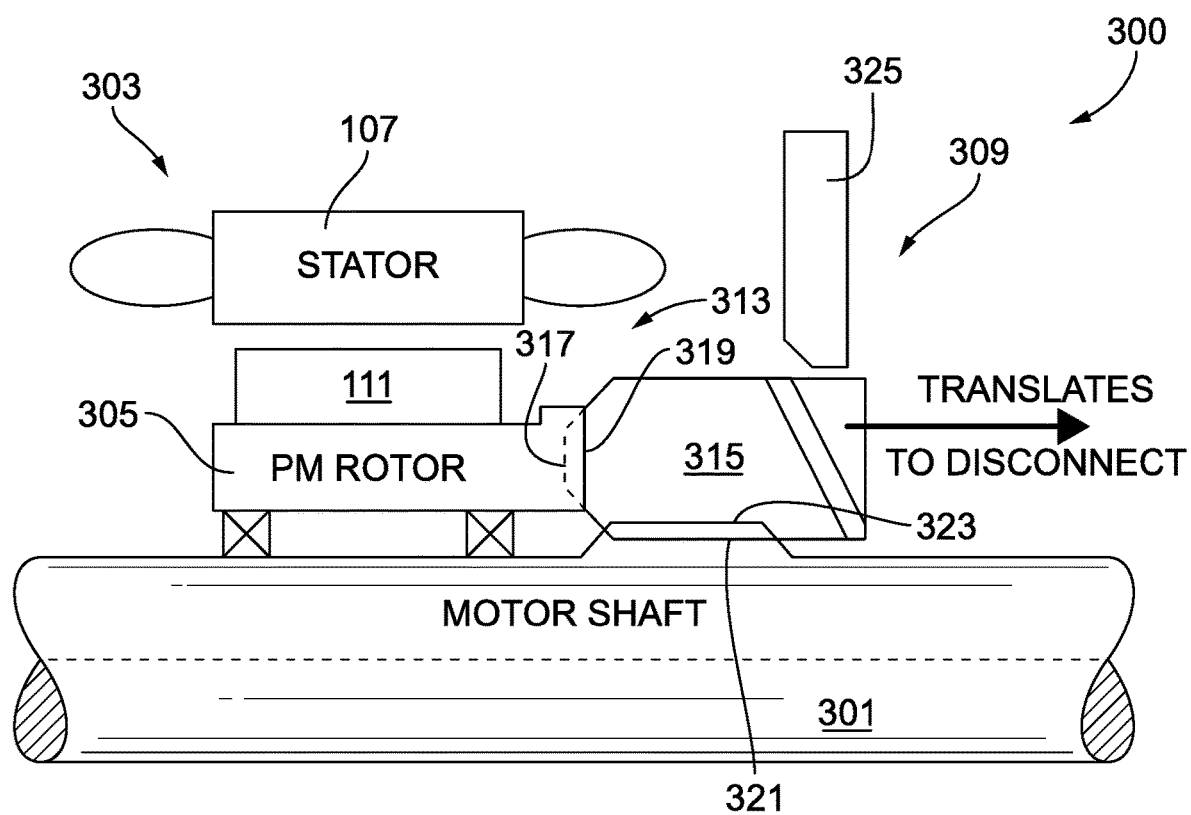
FIG. 3 is a cross-sectional schematic view of an embodiment of a system in accordance with this disclosure, showing an embodiment of a mechanical disconnect system in accordance with this disclosure.

Referring to FIG. 3, in certain embodiments, the clutch mechanism 313 can be a face clutch mechanism 313 configured to slidably actuate (e.g., axially along the shaft 301)

a face clutch member 315 that rotates with the shaft 301 to engage the rotor 305 in the first state and to disengage the rotor 305 in the second state to mechanically disconnect the rotor 305 from the shaft 301. For example, the rotor 305 can include one or more rotor splines 317 configured to engage with one or more face splines 319 of the face clutch member 315 in the first state (e.g., as shown). The face clutch member 315 can be splined to the shaft 301 via one or more shaft splines 321 in connection with one or more axial splines 323 of the face clutch member 315.

The face clutch mechanism 313 can include a biasing member 325 (e.g., biased in a downward direction as shown) configured to bias the face clutch member 315 (e.g., using a ramped face as shown to provide a camming action) toward the first state (e.g., in engagement with the rotor 305). The face clutch member 315 can be actuated by any suitable actuator connected thereto to pull the face clutch member 315 against the bias of the biasing member 325 (e.g., to pull to the right as shown). Any other suitable face clutch assembly and/or components therefor are contemplated herein.

Figure 4:
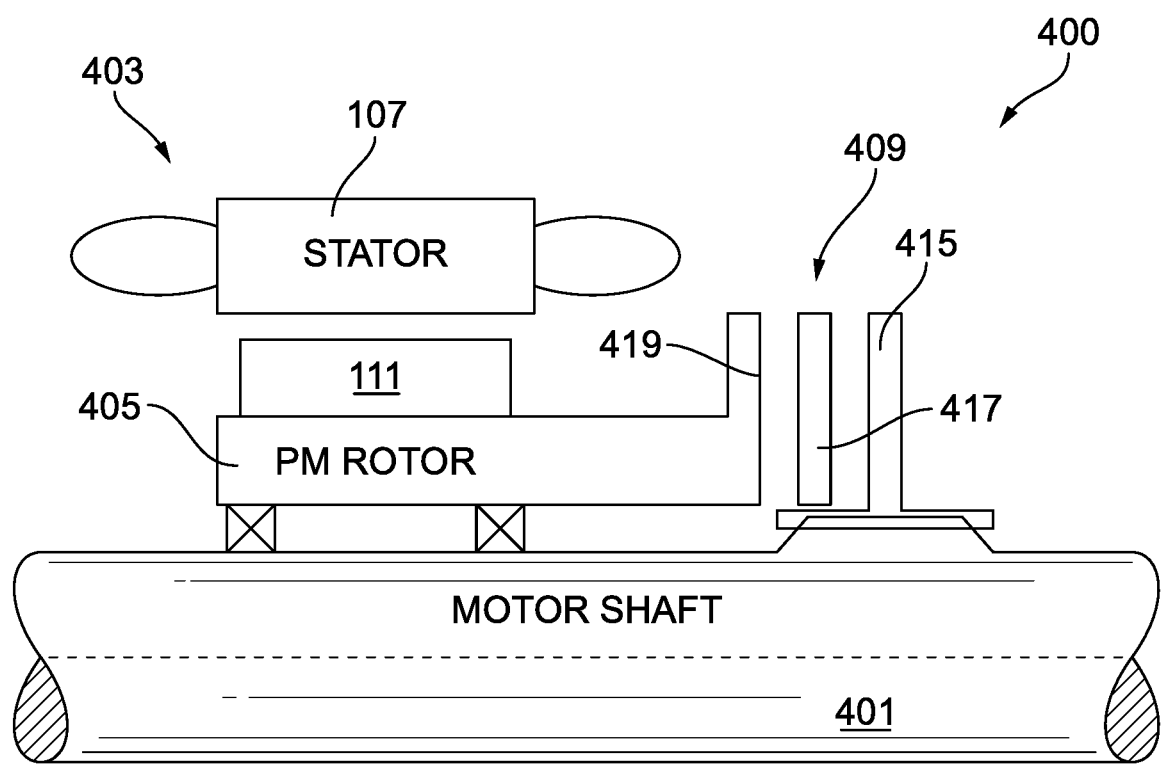
FIG. 4 is a cross-sectional schematic view of an embodiment of a system in accordance with this disclosure, showing an embodiment of a mechanical disconnect system in accordance with this disclosure.

In certain embodiments, referring to FIG. 4, the clutch mechanism 413 can be a friction clutch mechanism 413 having an actuator 415 and a friction member 417 (e.g., an elastic material disk). For example, the actuator 415 can connect to the shaft 401 (e.g., via a spline connection) to rotate with the shaft 401 and to slide axially on the shaft 401. The friction member 417 can be configured to be pushed by the actuator 415 (e.g., to the left as shown) to contact a rotor face 419 (e.g., an end portion of the rotor 405 that is wider radially) to provide a frictional mechanical connection between the shaft 401 and the rotor 405 in the first state and to not push on the friction member 417 in the second state to mechanically disconnect the shaft 401 and the rotor 405 in the second state. Any suitable actuator and/or frictional member is contemplated herein as appreciated by those having ordinary skill in the art in view of this disclosure.

Figure 5:
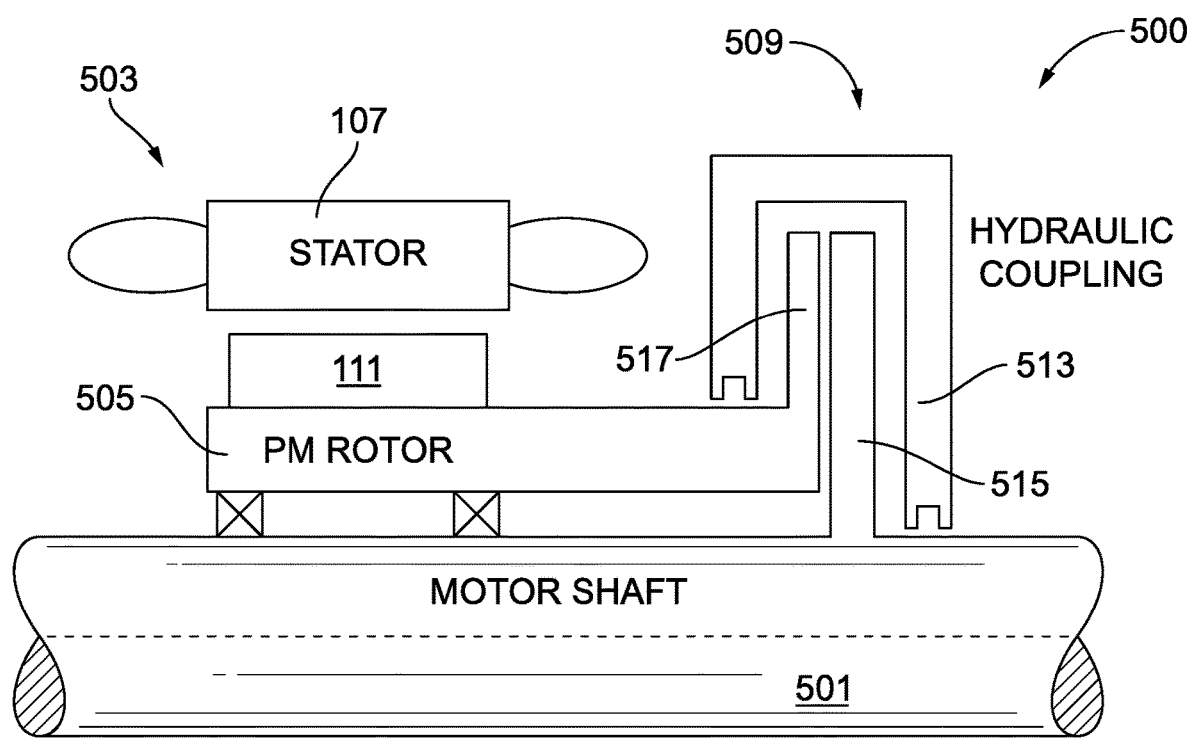
FIG. 5 is a cross-sectional schematic view of an embodiment of a system in accordance with this disclosure, showing an embodiment of a mechanical disconnect system in accordance with this disclosure.

Referring to FIG. 5, in certain embodiments, the clutch mechanism 513 can be a hydraulic coupling 513 disposed around a rotor fan 517 and a shaft fan 515. The hydraulic coupling 513 can be configured to be sealed to the rotor 505 and the shaft 501 to retain a liquid (e.g., hydraulic fluid) therein when in a flooded state. The rotor fan 517 and the shaft fan 515 can be configured to be fluidly coupled in the flooded state (where liquid fills the cavity defined by the hydraulic coupling) such that the rotor fan 517 drives the shaft fan 515 (and thus drives the shaft 501). The rotor fan 517 and the shaft fan 515 can be configured to be fluidly decoupled in a drained state (e.g., when sufficient liquid, e.g., all, is drained from the coupling, e.g., and the couple is filled with air or vacuum). Any suitable fluid connections, pumps, and/or fluid sources to selectively fill and drain the hydraulic coupling 513 are contemplated herein. Any other suitable design and/or components for the hydraulic coupling 513 as appreciated by those having ordinary skill in the art in view of this disclosure is contemplated herein.

As shown in FIGS. 1-5, certain embodiments can include one or more bearings 135 disposed between the rotor 105, 205, 305, 405, 505 and the shaft 101, 201, 301, 401, 501 to allow the shaft to rotate relative to the rotor in the second state. Certain embodiments can include a fuel powered engine 137 (e.g., fossil fuel powered, e.g., a turbomachine) operatively connected to the shaft to drive the shaft. While certain embodiments of mechanical disconnection systems are disclosed above, any suitable mechanical disconnection system as appreciated by those having ordinary skill in the art in view of this disclosure is contemplated herein.

In accordance with at least one aspect of this disclosure, a method can include mechanically disconnecting a rotor of an electrical machine from a shaft when an engine is driving the shaft. The method can include mechanically disconnecting the rotor of the electrical machine includes releasing a clutch mechanism. Any other suitable methods and/or portion thereof are contemplated herein.

Figure 6:
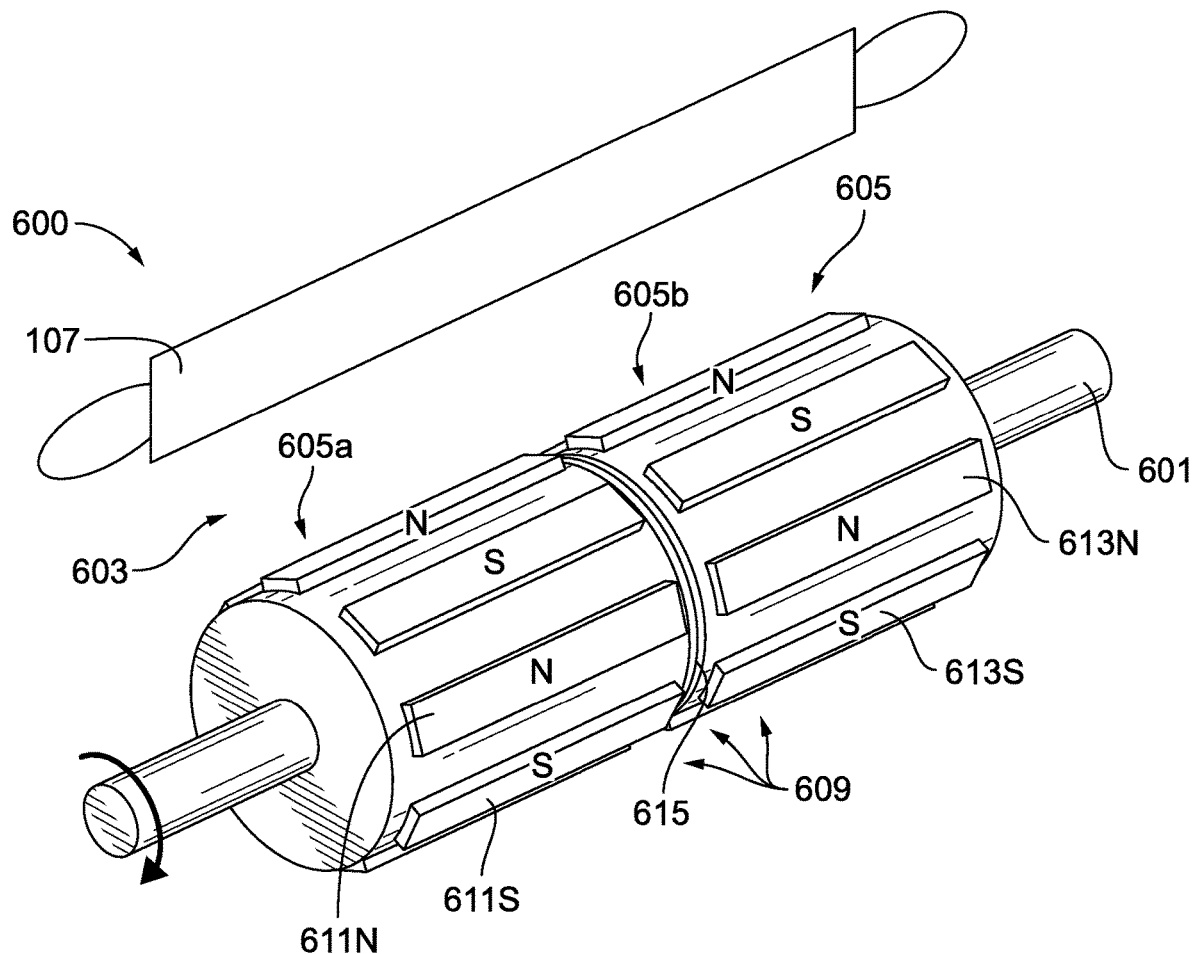
FIG. 6 is a perspective schematic view of an embodiment of a rotor electromagnetic property modifying system in accordance with this disclosure, showing an embodiment of a rotor attached to a shaft.

In accordance with at least one aspect of this disclosure, referring to FIG. 6, a hybrid drive system 600 can include a shaft 601, an electrical machine 603 having a stator 107, and a rotor 605 attached to the shaft 601 to rotate with the shaft 601 relative to the stator 107. The system 600 can include a rotor electromagnetic property modifying system 609 configured to modify an electromagnetic property of the rotor 605 to cause the rotor 605 and the stator 107 to be at least partially electromagnetically inactivated (e.g., either at least partially decoupled or caused to internally cancel output). For example, the rotor electromagnetic property modifying system 109 can include a pole modification device (e.g., clocking mechanism 615) configured to modify one or more magnetic poles (e.g., change the location of relative to one or more other poles), e.g., 611N, 611S, 613N, 613S of the rotor 605 to at least partially electromagnetically inactivate the electrical machine 603.

In certain embodiments, the rotor 605 can be a permanent magnet rotor, as shown. The rotor 605 can include a first portion 605a, and a second portion 605b rotatable relative to the first portion 605a. The rotor 605 can include plurality of first permanent magnet poles 611N, 611S disposed on the first portion 605a and a plurality of second permanent magnet poles 613N, 613S disposed on the second portion 605b. The system 609 can include a clocking mechanism 615 configured to rotate one or both of the first portion 605a and the second portion 605b to change a relative position between the first poles 611N, 611S of the first portion 605a and the second poles 613N, 613S of the second portion 605b to at least partially electromagnetically inactivate the electrical machine 603. The clocking mechanism 615 can include any suitable actuator (e.g., an electric motor) and/or component(s) configured to connect to both portions 605a, 605b and to selectively allow rotatable motion therebetween. For example, the actuator can include an electric motor that is controlled in any suitable manner (e.g., by a controller as a function of electrical output from the stator 107). In certain embodiments, the clocking mechanism 615 can be a biased coaxial bearing that is configured to be biased to the misaligned position, and having a releasable mechanism to allow rotation to the misaligned position. Any suitable structure and/or component(s) are contemplated herein.

The clocking mechanism 615 can be configured to move the plurality of poles from an aligned state (e.g., as shown in FIG. 6) to a misaligned state to at least partially electromagnetically inactivate the electrical machine 603. For example, the first poles 611N, 611S and the second poles 613N, 613S can include circumferentially alternating north poles 611N, 613N and south poles 611S, 613S. The aligned state can be defined by each north pole 611N of the first poles 611N, 611S aligning with each north pole 613N of the second poles 613N, 613S, and each south pole 611S of the first poles 611N, 611S aligning with the each south pole 613S of the second poles 613N, 613S. The misaligned state can be defined by opposite pole alignment such that north poles 611N, 613N of each portion 605a, 605b align with south poles 613S, 611S of the other portion 605b, 605a. The aligned state can correspond to an activated state, and the misaligned state can correspond to an inactivated state where rotor 605 rotation does not cause output from the stator 107 and such that input to the stator 107 does not cause rotor 105 rotation. Any other suitable aligned and misaligned states to prevent output from the stator 107 due to rotation of the rotor 605 and/or to prevent driving the rotor 605 with input to the stator 107 is contemplated herein. As appreciated by those having ordinary skill in the art in view of this disclosure, misaligning poles can prevent production of electrical output by creating two opposite outputs in the stator 107, thereby cancelling out electrical production from the stator 107. Such embodiments may have no mechanical disconnect, and may still provide a resistance to an engine 137 driving shaft 601, for example.

In accordance with at least one aspect of this disclosure, a rotor 605, e.g., as described above, for an electrical machine can include a first portion 605a (e.g., a first half) and a second portion 605b (e.g., a second half) configured to connect to a shaft 601 and to rotate relative to each other on the shaft 601. At least one clocking mechanism 615, e.g., as described above, can be defined by or connected to the first portion and the second portion and configured to move the first portion and second portion relative to each other to modify an electromagnetic property of the rotor. The rotor 605 can include any other suitable components, e.g., as appreciated by those having ordinary skill in the art in accordance with this disclosure (e.g., more than two portions 605a, 605b). While embodiments are described above, any suitable electromagnetic inactivation (e.g., preventing generation or output of electrical current from the stator due to rotation of the rotor, and/or preventing rotor motion due to input current to the stator) is contemplated herein as appreciated by those having ordinary skill in the art in view of this disclosure.

In accordance with at least one aspect of this disclosure, a method, can include modifying an electromagnetic property of a permanent magnet rotor of an electrical machine to at least partially electromagnetically inactivate an electrical machine having a rotor attached to a rotating shaft and a stator without stopping rotation of the rotor. Modifying the electromagnetic property can include rotating at least a first portion of the rotor relative to a second portion of the rotor. In certain embodiments, modifying the electromagnetic property can include modifying magnetic pole alignment of one or more permanent magnetic poles of the rotor. Any other suitable methods and/or portions thereof are contemplated herein.

Figure 7:
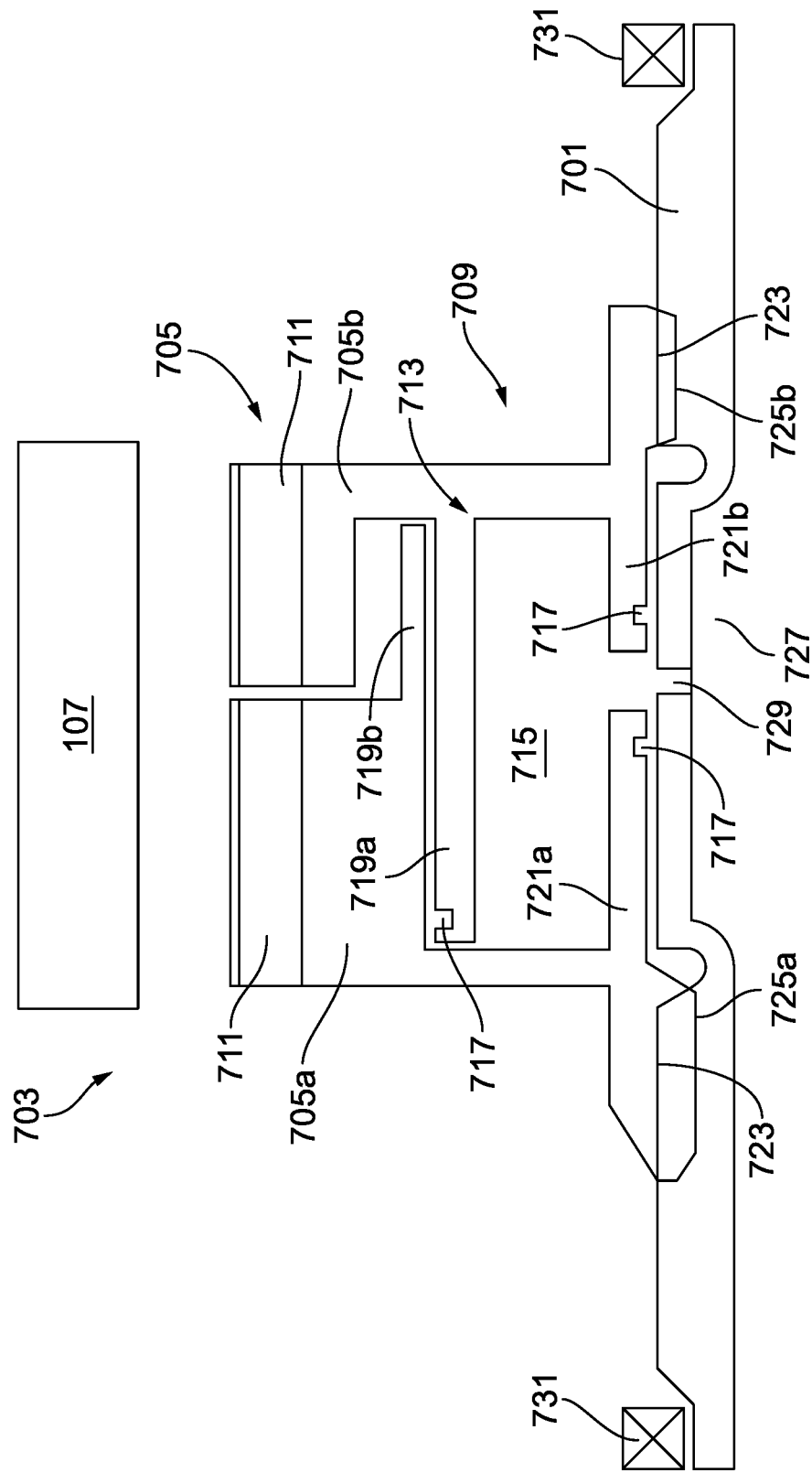
FIG. 7 is a cross-sectional schematic view of an embodiment of a system in accordance with this disclosure, showing an embodiment of an electromagnetic disconnect system in accordance with this disclosure.
Figure 8:
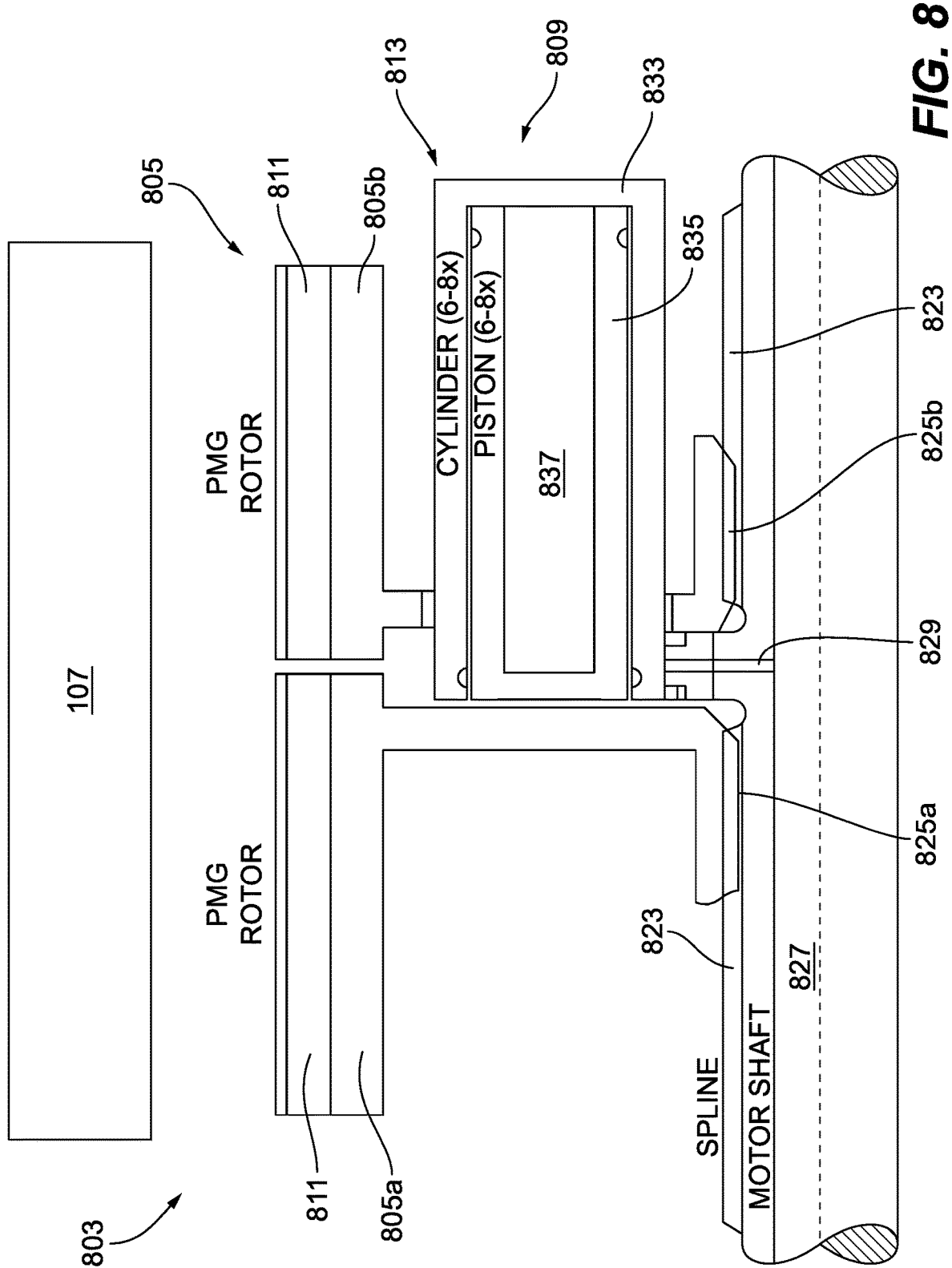
FIG. 8 is a cross-sectional schematic view of an embodiment of a system in accordance with this disclosure, showing an embodiment of an electromagnetic disconnect system in accordance with this disclosure.

In accordance with at least one aspect of this disclosure, referring to FIGS. 7 and 8, a hybrid drive system 700, 800 can include a shaft 701, 801 and an electrical machine 703, 803 having a stator 107 and a rotor 705, 805 attached to the shaft 701, 801 to rotate with the shaft 701, 801 relative to the stator 107. The system 700, 800 can include an electromagnetic disconnect system 709, 809 configured to modify a position of the rotor 705, 805 to cause the rotor 705, 805 and the stator 107 to be at least partially electromagnetically decoupled. As shown, the rotor 705, 805 can include a permanent magnet 711, 811 (e.g., one or more), for example. Any other suitable type of magnet (e.g., an electromagnet) is contemplated herein.

The electromagnetic disconnect system 709, 809 can be configured to move the rotor 705, 805 relative (e.g., axially) to the stator 107 to at least partially (e.g., fully) electromagnetically decouple the rotor 705, 805 and the stator 107. The electromagnetic disconnect system 709, 809 can be configured to move at least a portion of the rotor 705, 805 axially along the shaft 701, 801, for example.

The electromagnetic disconnect system 709, 809 can include at least one hydraulic actuator assembly 713, 813 configured to selectively move at least a portion of the rotor 705, 805 axially along the shaft 701, 801 to at least partially electromagnetically decouple the rotor 705, 805 and the stator 107. For example, the rotor 705, 805 can include a first portion 705a, 805a (e.g., a first half) and a second portion 705b, 805b (e.g., second half) configured to move relative to each other between an electromagnetically coupled position (e.g., as shown in FIGS. 7 and 8) and an at least partially electromagnetically decoupled position (e.g., where first portion 705a, 805a is separated from second portion 705b, 805b).

Referring to FIG. 7, in certain embodiments, the first portion 705a and the second portion 705b can define at least one hydraulic cavity 715 of the at least one hydraulic actuator assembly 713. In certain embodiments, the at least one hydraulic cavity 715 can be a single annular cavity, for example.

The first portion 705a and the second portion 705b can be sealed to each other and to the shaft 701 with one or more seals 717 as shown. In certain embodiments, each of the first portion 705a and the second portion 705b can include a long leg 719a, 719b and/or a short leg 721a, 721b forming at least part of the hydraulic actuator assembly 713. As shown, the short legs 721a, 721b may be dimensioned to leave a gap in the electromagnetically coupled state to always have a hydraulic pathway to the at least one hydraulic cavity 715, e.g., as described below. In certain embodiments, the long legs 719a, 719b can be sealed to each other with at least one seal 717.

Referring to both FIGS. 7 and 8, the first portion 705a, 805a and the second portion 705b, 805b can be slidably splined to the shaft 701, 801 via one or more mating splines 723, 823 on the shaft 701, 801 and one or more rotor splines 725a, 825a, 725b, 825b. As shown in FIG. 7, in certain embodiments, the at least one cavity 715 can be in fluid communication with a shaft cavity 727 through a shaft hole 729 to provide hydraulic pressure to the at least one cavity 715 through the shaft 701. The system as shown in FIG. 8 and further described below can include a similar hydraulic pathway through the shaft 801 as shown. Any other suitable hydraulic system and/or pathway is contemplated herein.

As shown, the system 700 can include one or more backstops 731 configured to limit motion of the rotor 705 and/or portions 705a, 705b thereof, e.g., to prevent separation of the first portion 705a and the second portion 705b in the at least partially electromagnetically decoupled position. For example, backstops 731 can stop further separation of the rotor portions 705a, 705b before long legs 719a, 719b move out of contact to maintain a seal.

Referring to FIG. 8, in certain embodiments, the at least one hydraulic actuator assembly 809 can include at least one nested piston assembly comprising a cylinder 833 and a piston 835 in a sealed sliding connection within the cylinder 833. The piston 835 and the cylinder 833 can define a hydraulic cavity 837 as shown (e.g., in fluid communication with a shaft cavity 827 through shaft opening 829, similar to the embodiment of FIG. 7 as described above). The piston 835 and the cylinder 833 can be configured to move relative to each other to move the first portion 805a and the second portion 805b relative to each other. For example, the cylinder 833 can be connected to the second portion 805b and the piston 835 can be connected to or at least be in contact with the first portion 805a to push the portions apart when expanded.

In certain embodiments, the at least one hydraulic actuator assembly 809 can include a plurality of hydraulic actuator assemblies 809 disposed circumferentially around at least one of the first portion 805a and/or the second portion 805b of the rotor 805 to provide multiple actuation points. In certain embodiments, one or more mirrored actuators (a mirror image of that shown FIG. 8) can be connected to provide opposing actuation when desired to provide push actuation in both directions to allow the portions 805a, 805b to be both separated and pushed back together. Any suitable assembly and/or hydraulic components are contemplated herein.

In accordance with at least one aspect of this disclosure, a rotor 705, 805 for an electrical machine can include a first portion and a second portion configured to slidably connect to a shaft and to move relative to each other on the shaft. The rotor can include at least one hydraulic actuator assembly at least partially defined by or connected to the first portion and the second portion and configured to move the first portion and second portion between an electromagnetically coupled position and an at least partially electromagnetically decoupled position on the shaft. In certain embodiments, as shown in FIG. 7, the first portion 705a and the second portion 705b can define at least one hydraulic cavity of the at least one hydraulic actuator assembly. Embodiments, e.g., as disclosed in FIGS. 7 and 8, can remove the magnet from the inside of an electrical machine thereby at least partially, if not fully, decoupling the rotor and the stator for example.

In accordance with at least one aspect of this disclosure, a method can include at least partially electromagnetically decoupling a rotor attached to a rotating shaft from a stator of an electrical machine without stopping rotation of the rotor. At least partially electromagnetically decoupling can include axially moving at least a portion of the rotor relative to the stator.

In certain embodiments, axially moving at least a portion of the rotor relative to the stator can include actuating a hydraulic actuator to move at least a portion of the rotor relative to the stator. Axially moving at least a portion of the rotor relative to the stator can include moving a first portion of the rotor and a second portion of the rotor apart from each other to at least partially electromagnetically decouple the first portion and the second portion from the stator Traditional systems have no means to shut off the electrically driven motor from the driveline of a hybrid propulsion system. Certain embodiments disclosed hereinabove include systems configured to mechanically or otherwise disconnect an electrically driven motor from a fuel driven motor driveline, e.g., in the event of a system failure. Embodiments allow a fossil fuel driven motor to continue to provide propulsion without the electrically driven motor acting as a generator, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid drive system, comprising:
a shaft; and
an electrical machine, comprising:
   a stator; and
   a rotor attached to the shaft to rotate with the shaft relative to the stator; and
an electromagnetic disconnect system configured to modify a position of the rotor to cause the rotor and the stator to be at least partially electromagnetically decoupled, wherein the electromagnetic disconnect system is configured to move the rotor relative to the stator to at least partially electromagnetically decouple the rotor and the stator, wherein the electromagnetic disconnect system is configured to move at least a portion of the rotor axially along the shaft, wherein the electromagnetic disconnect system can include at least one hydraulic actuator assembly configured to selectively move at least a portion of the rotor axially along the shaft to at least partially electromagnetically decouple the rotor and the stator, wherein the rotor includes a first portion and a second portion configured to move relative to each other between an electromagnetically coupled position and an at least partially electromagnetically decoupled position, wherein the first portion and second portion define at least one hydraulic cavity of the at least one hydraulic actuator assembly, wherein the at least one hydraulic cavity is a single annular cavity, wherein the first portion and the second portion are slidably splined to the shaft via one or more mating splines on the shaft.

2. The system of claim 1, wherein the rotor includes a permanent magnet.

3. The system of claim 1, wherein the first portion and the second portion are sealed to each other and to the shaft with one or more seals.

4. The system of claim 3, wherein the at least one cavity is in fluid communication with a shaft cavity through a shaft hole to provide hydraulic pressure to the at least one cavity through the shaft.

5. The system of claim 4, further comprising one or more backstops configured to limit motion and prevent separation of the first portion and the second portion in the at least partially electromagnetically decoupled position.

6. The system of claim 1, wherein the at least one hydraulic actuator assembly includes at least one nested piston assembly comprising a cylinder and a piston in a sealed sliding connection within the cylinder, the piston and the cylinder being configured to move relative to each other to move the first portion and the second portion.

7. The system of claim 6, wherein the at least one hydraulic actuator assembly includes a plurality of hydraulic actuator assemblies disposed circumferentially around at least one of the first portion or the second portion of the rotor to provide multiple actuation points.

8. A hybrid drive system, comprising:
a shaft; and
an electrical machine, comprising:
   a stator; and a rotor attached to the shaft to rotate with the shaft relative to the stator; and an electromagnetic disconnect system configured to modify a position of the rotor to cause the rotor and the stator to be at least partially electromagnetically decoupled, wherein the electromagnetic disconnect system is configured to move the rotor relative to the stator to at least partially electromagnetically decouple the rotor and the stator, wherein the electromagnetic disconnect system is configured to move at least a portion of the rotor axially along the shaft, wherein the electromagnetic disconnect system can include at least one hydraulic actuator assembly configured to selectively move at least a portion of the rotor axially along the shaft to at least partially electromagnetically decouple the rotor and the stator, wherein the rotor includes a first portion and a second portion configured to move relative to each other between an electromagnetically coupled position and an at least partially electromagnetically decoupled position, wherein the at least one hydraulic actuator assembly includes at least one nested piston assembly comprising a cylinder and a piston in a sealed sliding connection within the cylinder, the piston and the cylinder being configured to move relative to each other to move the first portion and the second portion.

9. The system of claim 8, wherein the at least one hydraulic actuator assembly includes a plurality of hydraulic actuator assemblies disposed circumferentially around at least one of the first portion or the second portion of the rotor to provide multiple actuation points.

* * * * *